United States Patent
Lehy et al.

(10) Patent No.: US 7,600,801 B2
(45) Date of Patent: Oct. 13, 2009

(54) SEAT STORAGE ACTUATOR (75) Inventors: Douglas Jan Lehy, Eaton, OH (US); Richard Lee Schneider, Centerville, OH (US)

(73) Assignee: Globe Motors, Inc., Dayton, OH (US)

( * ) Notice: Subject to any disclaimer, the term of this patent is extended or adjusted under 35 U.S.C. 154(b) by 385 days.

(21) Appl. No.: 11/613,384

(22) Filed: Dec. 20, 2006

(65) Prior Publication Data
US 2008/0150312 A1  Jun. 26, 2008

(51) Int. Cl.
*B60N 2/02* (2006.01)
(52) U.S. Cl. ............. 296/65.08; 296/65.18; 297/330; 297/331; 297/344.17
(58) Field of Classification Search ......... 296/65.01, 296/65.08, 65.18, 69, 37.14; 297/330, 331, 297/344.17
See application file for complete search history.

(56) References Cited

U.S. PATENT DOCUMENTS

| | | | |
|---|---|---|---|
| 1,173,351 A | 2/1916 | Herington | |
| 1,649,608 A | 11/1927 | Matthews | |
| 3,171,682 A | 3/1965 | Buser et al | |
| 3,202,453 A | 8/1965 | Richards | |
| 4,005,902 A | 2/1977 | Balin | |
| 4,437,028 A * | 3/1984 | Ikeda | 310/198 |
| 4,462,274 A | 7/1984 | Reppert et al. | |
| 4,791,833 A | 12/1988 | Sakai et al. | |
| 4,812,838 A | 3/1989 | Tashiro et al. | |
| 4,822,093 A | 4/1989 | Kawai et al. | |
| 4,827,199 A | 5/1989 | Kaucic et al. | |
| 4,979,700 A | 12/1990 | Tiedeman et al. | |
| 5,012,693 A * | 5/1991 | Enomoto et al. | 74/479.01 |
| 5,195,795 A | 3/1993 | Cannera et al. | |
| 5,269,581 A | 12/1993 | Odagaki et al. | |
| 5,269,733 A | 12/1993 | Anthony, III | |
| 5,491,372 A | 2/1996 | Erhart | |
| 5,493,813 A | 2/1996 | Vetter et al. | |
| 5,772,274 A | 6/1998 | Tokarz | |
| 5,890,758 A | 4/1999 | Pone et al. | |
| 5,975,612 A | 11/1999 | Macey et al. | |
| 6,099,072 A | 8/2000 | Sturt et al. | |
| 6,106,046 A | 8/2000 | Reichel | |
| 6,131,999 A | 10/2000 | Piekny et al. | |

(Continued)

FOREIGN PATENT DOCUMENTS

EP  1764260  3/2007

*Primary Examiner*—Lori L Lyjak
(74) *Attorney, Agent, or Firm*—Adam K. Sacharoff; Much Shelist (57) ABSTRACT

An electric vehicle seat storage structure for moving a seat between a seating position and a storage position is provided. The seat storage structure includes a frame having an axle positioned along a rear portion of the cushion and having a seat gear mounted to the axle. An actuator is provided for moving the seat between a seating position and a storage position. The actuator has an output gear positioned about an output shaft that is defined along the longitudinal axis of the actuator. The actuator is mounted within a portion of the frame, such that the output gear and the seat gear are meshed thereto, and such that the axis of the actuator is substantially parallel to the axle of the seat storage frame. Wherein when the seat is moved between the seating position and the storage position, the actuator is moved therewith.

34 Claims, 12 Drawing Sheets

U.S. PATENT DOCUMENTS

| | | |
|---|---|---|
| 6,199,951 B1 | 3/2001 | Zeile et al. |
| 6,270,141 B2 | 8/2001 | Moon et al. |
| 6,388,355 B2 | 5/2002 | Tanaka et al. |
| 6,428,442 B1 | 8/2002 | Turgay et al. |
| 6,435,589 B2 | 8/2002 | Shimizu et al. |
| 6,563,245 B1 | 5/2003 | Suzuki et al. |
| 6,591,554 B2 | 7/2003 | Kumer, Jr. |
| 6,637,819 B2 | 10/2003 | Tame |
| 6,644,730 B2 | 11/2003 | Sugiura et al. |
| 6,700,244 B2 | 3/2004 | Hsu |
| 6,712,727 B2 | 3/2004 | Kujra et al. |
| 6,729,668 B2 | 5/2004 | Maibom |
| 6,846,044 B2 | 1/2005 | Moffa et al. |
| 6,857,981 B2 | 2/2005 | Hori et al. |
| 6,864,613 B1 | 3/2005 | Graham et al |
| 6,883,854 B2 | 4/2005 | Daniel |
| 6,944,906 B2 | 9/2005 | Moein et al. |
| 6,966,598 B2 | 11/2005 | Schmale |
| 6,969,934 B2 | 11/2005 | Neubauer et al. |
| 6,971,967 B2 | 12/2005 | Witmarsh |
| 6,974,174 B2 | 12/2005 | Imajo et al. |
| 6,997,498 B2 | 2/2006 | Oyama |
| 6,997,847 B2 | 2/2006 | Liu |
| 7,014,260 B2 | 3/2006 | Moriyama et al. |
| 7,033,296 B2 | 4/2006 | Takenaka |
| 7,052,428 B2 | 5/2006 | Bolz |
| 7,063,368 B2 | 6/2006 | Kayumi |
| 7,066,539 B2 | 6/2006 | Hatta et al. |
| 7,090,277 B2 | 8/2006 | Andrigo et al. |
| 7,108,306 B2 | 9/2006 | Suda et al. |
| RE39,315 E | 10/2006 | Kamida et al. |
| 7,152,900 B2 | 12/2006 | Trombley et al. |
| 7,152,922 B2 | 12/2006 | Garland |
| 7,156,442 B2 | 1/2007 | McManus et al. |
| 2001/0052718 A1 | 12/2001 | Sugiura et al. |
| 2003/0184112 A1 | 10/2003 | Furui |
| 2004/0195892 A1 | 10/2004 | Daniels |
| 2005/0006920 A1 | 1/2005 | Moriyama et al. |
| 2005/0035621 A1 | 2/2005 | Moriyama et al. |
| 2005/0046220 A1 | 3/2005 | Hernandez et al. |
| 2005/0161974 A1 | 7/2005 | Atcravi |
| 2005/0183525 A1 | 8/2005 | Blendea et al. |
| 2005/0184549 A1 | 8/2005 | Robinson et al. |
| 2006/0006720 A1 | 1/2006 | Yamada |
| 2006/0097538 A1 | 5/2006 | Vileminey |
| 2006/0255613 A1 | 11/2006 | Holmes et al. |
| 2007/0029888 A1 | 2/2007 | Schuler et al. |
| 2007/0029893 A1 | 2/2007 | Schuler et al. |
| 2008/0093875 A1 * | 4/2008 | Hatta et al. ............... 296/65.01 |

* cited by examiner

Section F9 Figure 9

SEAT STORAGE ACTUATOR

FIELD OF THE INVENTION

This invention relates to an actuator for a vehicle seat, for electrically storing or folding the seat and returning the seat to a seating position.

BACKGROUND OF THE INVENTION

Automobiles with folding or removable seats are well known in the art. Many motor vehicles, particularly sport utility vehicles and minivans, are equipped with rear seats that can be moved from a seating configuration, in which passengers can sit in the seat, to a so-called "load floor" configuration where the back support of the seat is folded downwardly to assume a horizontal orientation and thereby facilitate cargo stowage. Most folding seats require the operator to manually fold and unfold the seat. One disadvantage with manually folding and unfolding is the back support may be too heavy for all persons to operate safely. Another disadvantage with manually folding and unfolding is in some instances the folded back support is difficult to access and may require the operator to climb into the vehicle. It would be advantageous to provide a folding seat with an actuator for moving the seat to a folded downward position and back to a seating position automatically.

SUMMARY OF THE INVENTION

In accordance with an embodiment of the present invention there is provided an electric vehicle seat storage structure for moving a seat between a seating position and a storage position. The seat storage structure includes a seat storage frame having an axle positioned along a rear portion of a seat cushion and having a seat gear mounted to the axle. Further included therewith is an actuator for moving the seat between a seating position and a storage position. The actuator has an output gear positioned about an output shaft that is defined along the longitudinal axis of the actuator. The actuator is mounted within a portion of the seat storage frame, whereby when the seat is moved between the seating position and the storage position, the actuator is moved therewith. In addition, in its mounted position, the axis of the actuator is substantially parallel to the axle of said seat storage frame.

The actuator may be further defined by one or more of the following characteristics:

having a four stage planetary gear train;

have a four stage planetary gear train and output gear that provide a gear reduction of around 800 to 1, and more preferably around 700 to 1;

having planet gears defined by a first stage, of a four stage planetary gear train, made from a plastic material to reduce noise;

having planet gears defined by a first and/or a second stage, of a four stage planetary gear train, made from a plastic material to reduce noise;

a DC motor defined by having four poles and two brushes;

a DC motor with a wave wind armature coil pattern;

having an actuator that provides a peak sustainable output of about 200 Newton-meters of torque;

having a peak sustainable output of about 200 Newton-meters of torque and tolerance ring positioned between an output gear and an output shaft to provide an operational output of about 100-160 Newton-meters of torque;

having a first stage, of a four stage planetary gear train, with three first stage gears rotatably mounted to a triangularly shaped planetary carrier plate;

having second, third, and fourth stages, of a four stage planetary gear train, separately including four gears rotatably mounted to a square shaped planetary carrier plate; or having the seat gear positioned within a gear cap that is secured against a lower portion of a ring gear housing defined by the actuator.

In another embodiment, there is provided an electric vehicle seat storage structure for moving a seat between a seating position and a storage position. The seat storage structure includes a seat storage frame having a longitudinal axle positioned along a portion of a seat cushion and includes an actuator for driving the axle to move the seat between a seating position and a storage position. The actuator is mounted within a portion of the seat storage frame, such that when the seat is moved between the seating position and the storage position, the actuator is moved therewith.

In this embodiment it is further a consideration that a portion of the seat storage frame for mounting the actuator is positioned such that a longitudinal axis of the actuator is substantially parallel to the axle of the seat storage frame. And in addition thereto, the actuator has an output gear positioned about an output shaft that is defined along the longitudinal axis of the actuator and the output gear is meshed to a seat gear mounted to the seat axle.

In another embodiment, there is provided an actuator having a motor housing, a four pole, two brush DC motor mounted within the motor housing to rotate a pinion gear mounted on an armature shaft, a gear housing within an internal gear secured to the motor housing, a four stage planetary gear train, having a first stage meshed to the pinion gear, the four stage planetary gear train being further meshed to the internal gear, an output gear mounted on a output shaft that is rotated by a last stage, defined by the four stage planetary gear train, such that the four stage planetary gear train to the output gear is further defined to provide a gear reduction of around 700 to 1.

The actuator may further have the first and/or the second stages, of the four stage planetary gear train, made from a plastic material to reduce noise.

The actuator may further have an armature shaft that includes a tip, which extends into a centered opening on a first stage carrier plate defined by the first stage of the four stage planetary gear train.

Other advantages and characteristics mentioned above with respect to the actuator used in combination with the seat storage structure may be included in the present embodiment.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein:

FIG. 1b is a perspective view of the vehicle seat storage structure of FIG. 1a shown in an intermediate position;

DETAILED DESCRIPTION OF THE EMBODIMENTS

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or claims of the embodiments illustrated.

Figure 1A:
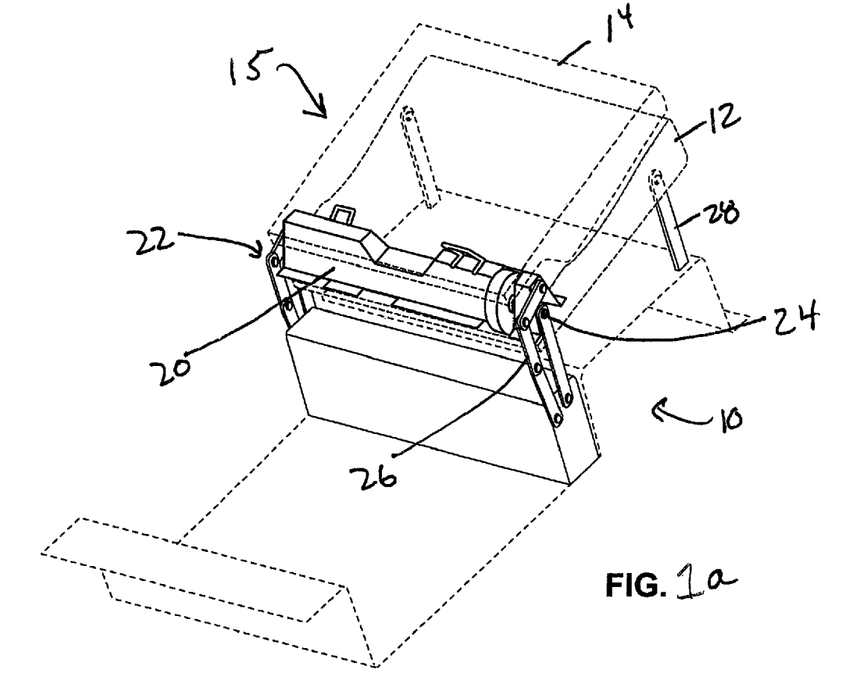
FIG. 1a is a perspective view of a vehicle seat storage structure in accordance with an embodiment shown in the seating position.
Figure 1C:
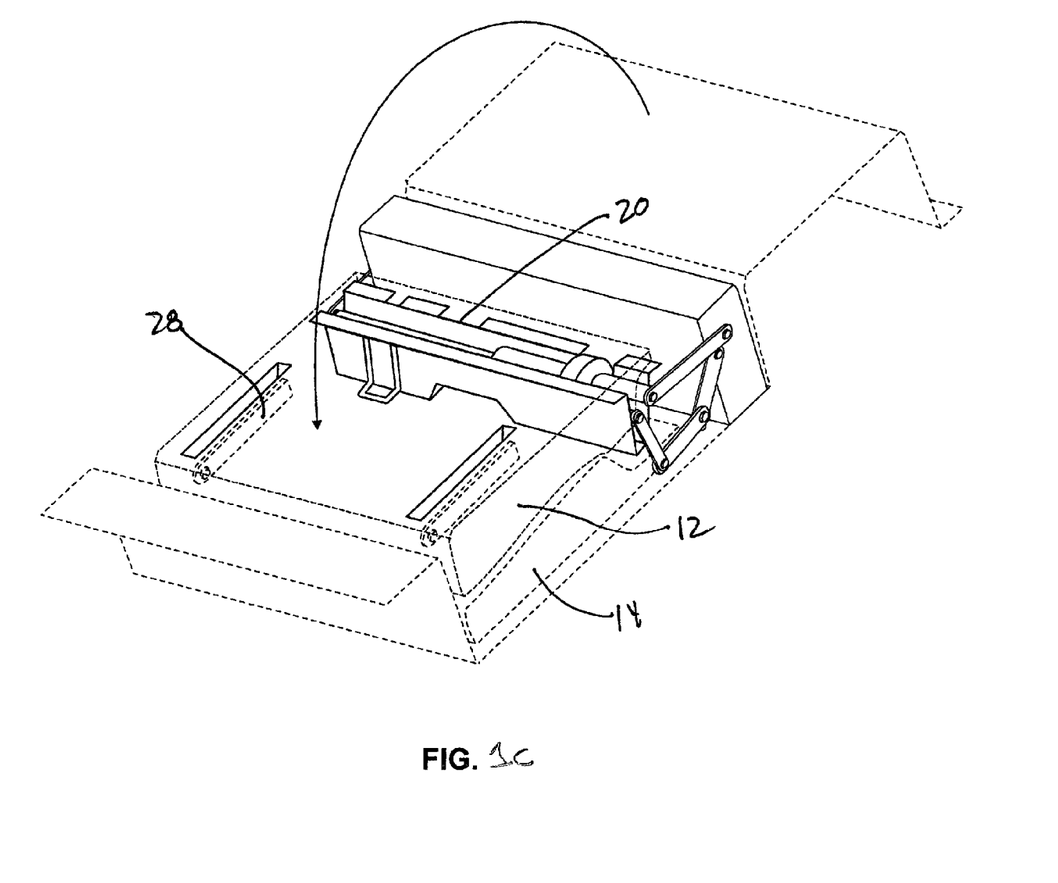
FIG. 1c is a perspective view of a vehicle seat storage structure of FIG. 1a shown in the storage position.

Referring now to FIGS. 1*a* to 1*c*, there is shown a vehicle seat storage structure 10. The seat storage structure 10 includes a seat 15 defined by cushions 11, which may include bottom cushion 12 and back cushion 14. The vehicle seat storage structure 10 further includes a frame 20 that is positioned about the rear portion of the cushions 11 and most preferably about the rear portion 22 of the bottom cushion 12. The frame 20 includes a seat axle 24 that provides a rotational pivot for moving the seat 15 between a seating position (FIG. 1*a*) to a vehicle seat storage position (FIG. 1*c*). Various pivoting rear leg members 26 are attached or secured to the frame 20 and may be driven or moved by the rotation of the seat axle 24; front pivoting leg members 28 may also be included and may be freely pivoting with the movement of the seat 15.

Figure 1D:
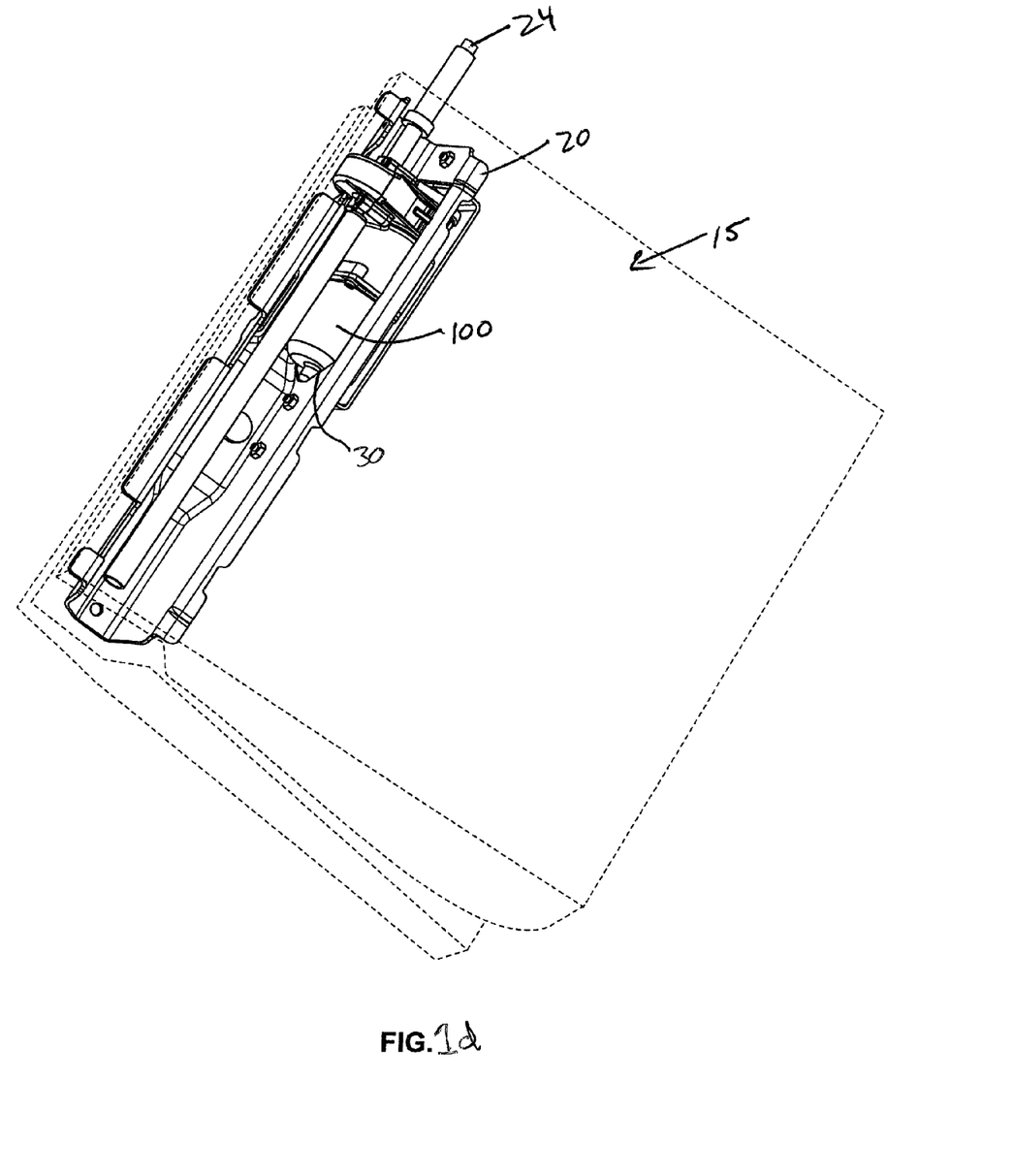
FIG. 1*d* is a perspective view of a frame of the vehicle seat storage structure.

The actuator 100 is positioned, best shown in, FIG. 1*d* in a section 30 of the frame 20. The section 30 may be recessed or hollowed out from the frame 20. The section 30 is positioned such that the actuator 100 may be positioned such that its longitudinal axis is parallel to the seat axle 24.

Figure 1E:
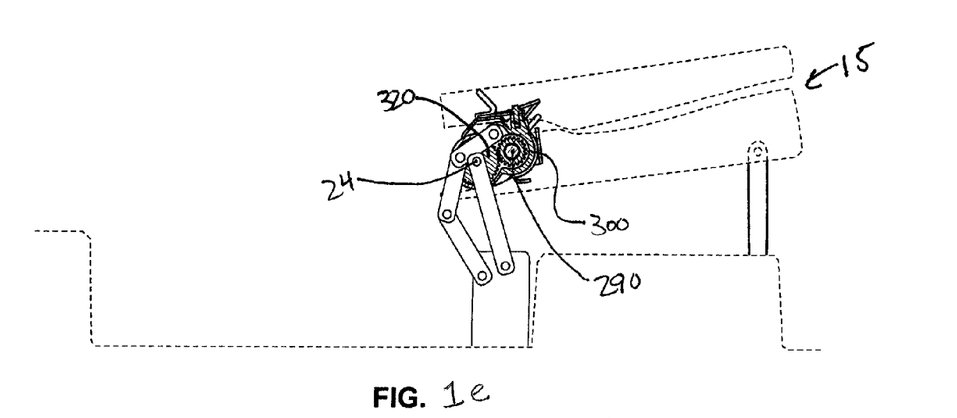
FIG. 1*e* is a partial side view of the vehicle seat storage structure of FIG. 1*a*.
Figure 1F:
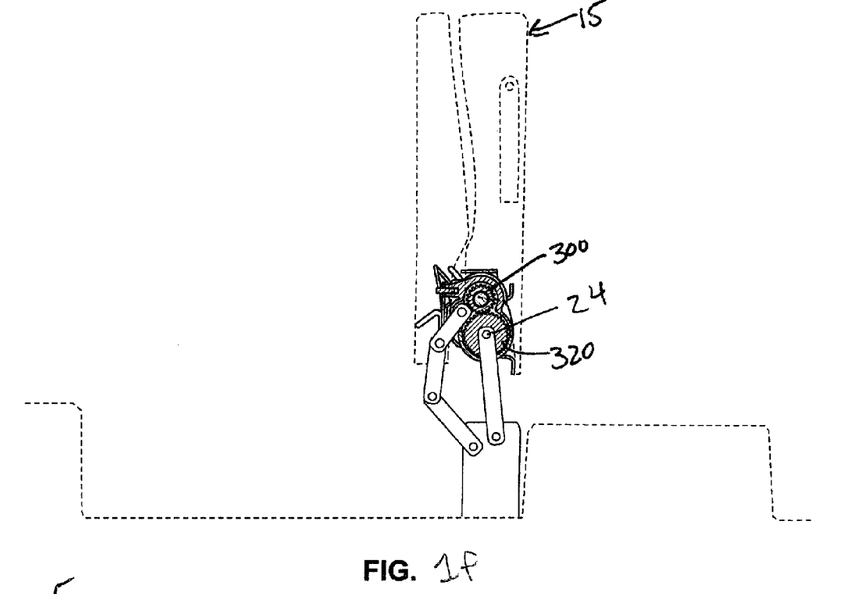
FIG. 1*f* is a partial side view of the vehicle seat storage structure of FIG. 1*b*.
Figure 1G:
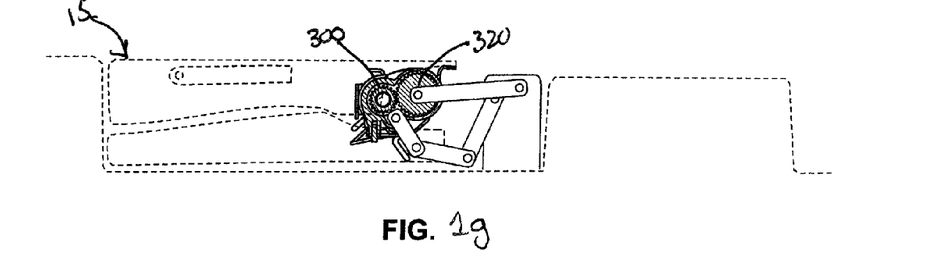
FIG. 1*g* is a partial side view of the vehicle seat storage structure of FIG. 1*c*.

During operation, illustrated also in FIGS 1*e* to 1*g*, the actuator 100 rotates an output gear 300 about an output shaft 290. The output shaft 290 lies in the longitudinal axis of the actuator 100 and is substantially parallel to the seat axle 24. Meshed to the output gear 300 is a seat gear 320, which is only secured to the seat axle 24. Therefore, when the actuator 100 is rotating the output gear 300 the seat axle 24 will rotate, cause the seat to move between the seating position and the stowing position.

Figure 2:
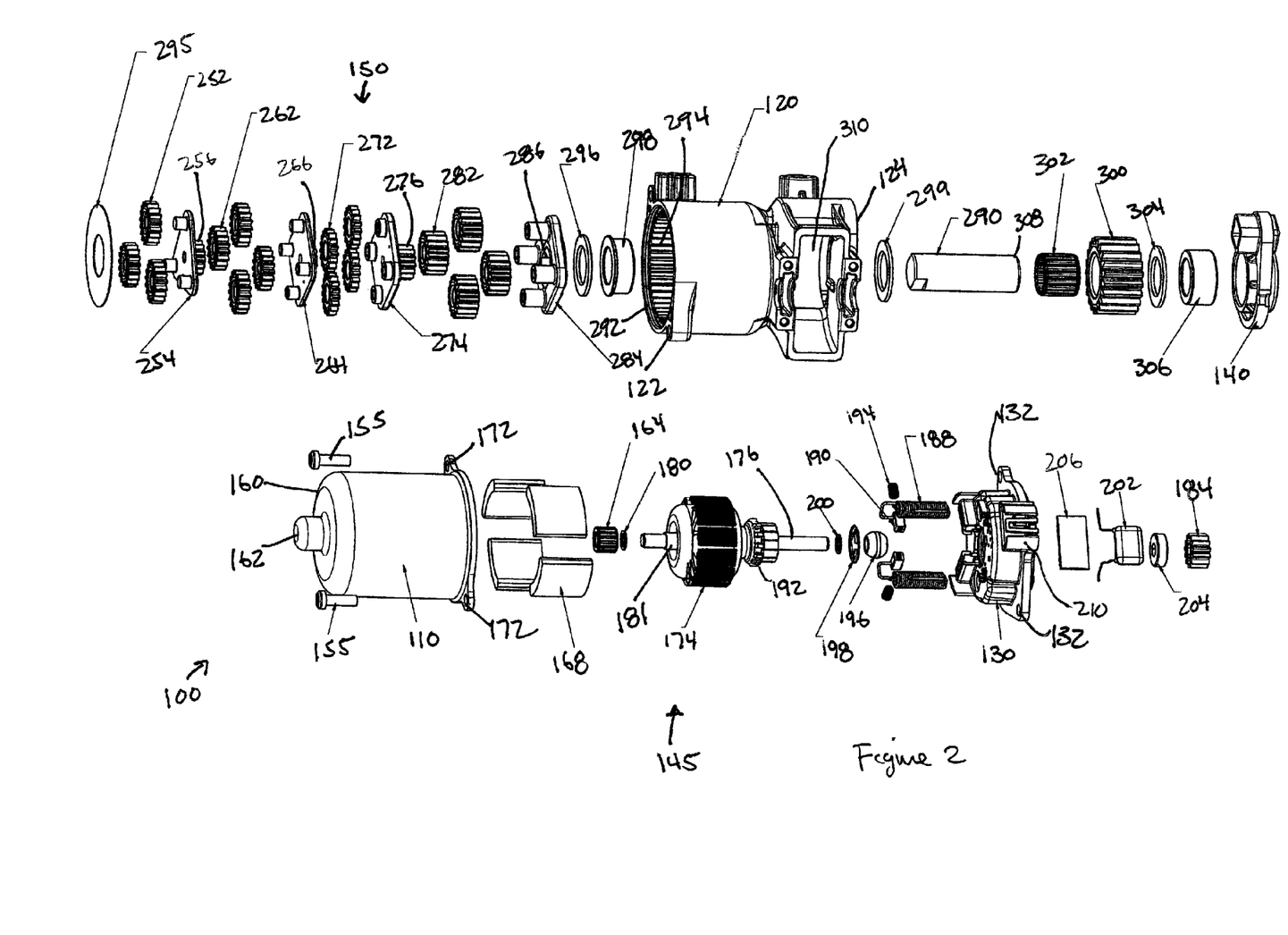
FIG. 2 is an exploded view of the actuator in accordance with an embodiment of the present invention.
Figure 2B:
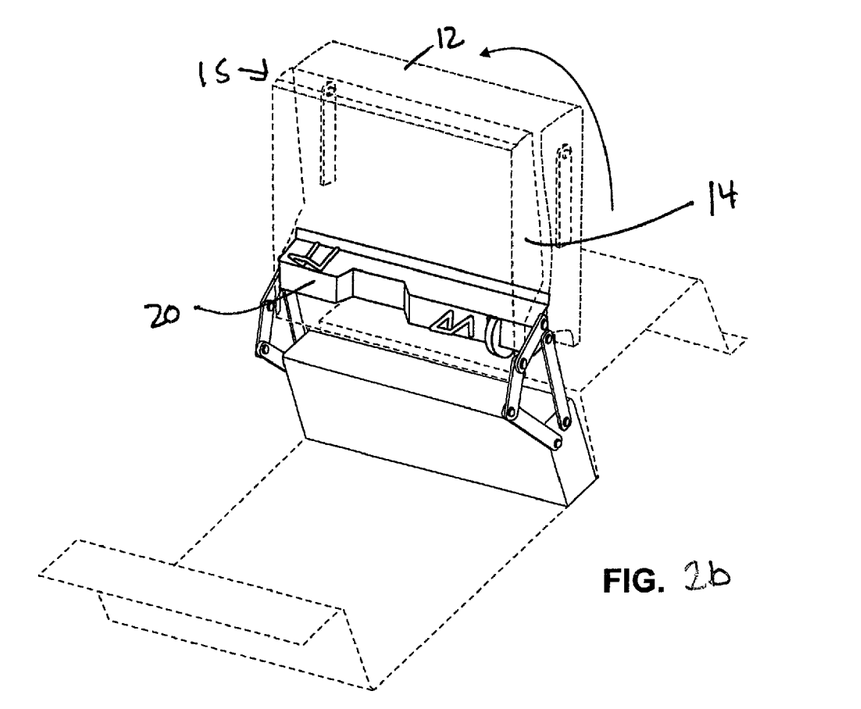

Referring now to FIG. 2, there is shown an exploded view of the seat actuator 100. The seat actuator 100 has a motor housing 110 which is secured to one end 122 of a ring gear housing 120. Sandwiched between the motor housing 110 and the ring gear housing 120 is an end bell 130. The ring gear housing 120 includes a second end 124 that has attached thereto an end cap 140.

Figure 3:
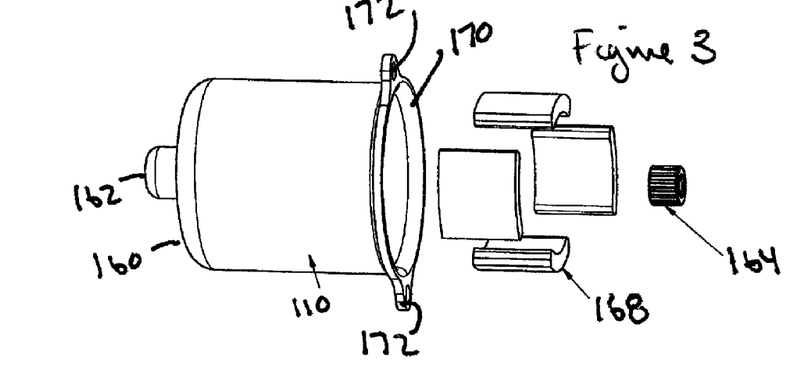
FIG. 3 is an exploded view of the motor housing and magnets and bearing from FIG. 2.
Figure 4:
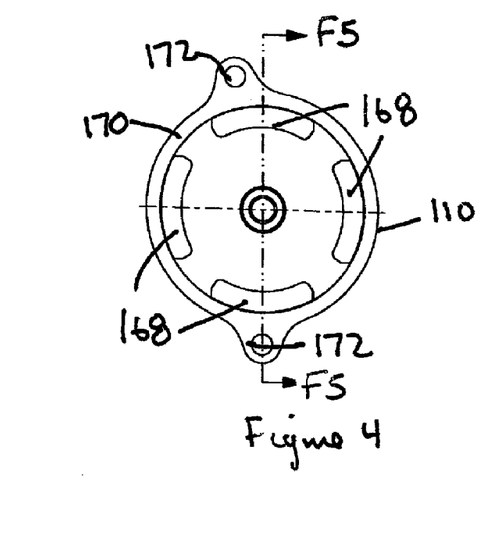
FIG. 4 is a bottom view of FIG. 3 with the magnets and bearing inserted into the motor housing.
Figure 5:
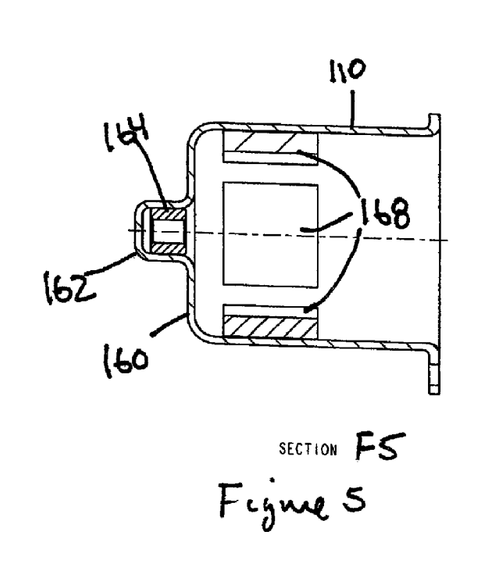
FIG. 5 is a cross sectional view taken across F5 on FIG. 4.

The motor housing 110 is designed to house various components of a motor 145 used to covert electrical energy to mechanical energy at a predetermined speed and torque to a power gear train 150. Also shown in FIGS. 3-5, the motor housing 110 includes a top domed section 160 with a protruding knob 162 used to position an armature bearing 164. Secured to the interior 166 of the motor housing 110 are magnets 168. The present embodiment uses 4 magnets 168 to define a 4 pole DC motor, however, it is possible that more or less magnets are used depending upon the desired results. The motor housing 110 further includes a bottom section 170 with at least one aperture 172 sized to receive a fastening means 155 to aid in securing the motor housing 110 to the ring gear housing 120.

Figure 6:
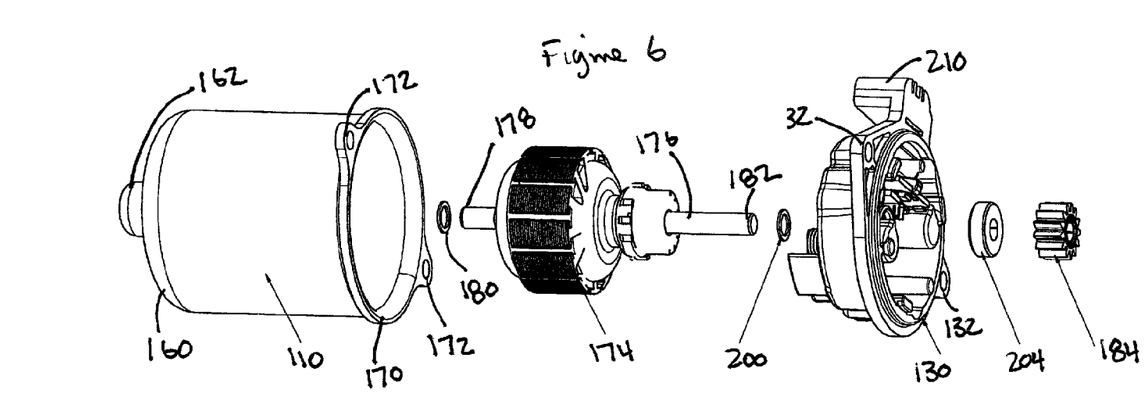
FIG. 6 is an exploded view of the motor housing showing the armature and end bell of FIG. 2.

The motor housing 110 is further shaped to receive the motor 145 which includes an armature 174 positioned on an armature shaft 176, illustrated in FIG. 6. The armature 174 is preferably using a wave winding format on a thirteen slot lamination. (However, it may be contemplated to use a different type of winding on a lamination with a different number of slots.) The wave winding allows the use of only two brushes with the four magnets 168. The reduced number of brushes allows for an improved packaging for the EMI inductors and capacitor. The armature shaft 176 includes a first end 178 positioned within or against the armature bearing 164. A thrust washer 180 may be further positioned between the armature bearing 164 and a spacer 181. The spacer 181 is further positioned about the armature shaft 176. The second end 178 of the armature shaft 176 is positioned through the end bell 130 and secured to a pinion gear 184.

The use of a four pole, two brush DC motor with a wave wind armature coil pattern creates additional package space for EMI suppression components such as inductors and the capacitor. The four pole two brush motor configuration also allows for the use of a shorter, smaller diameter motor, thereby reducing the overall actuator package size.

Figure 7:
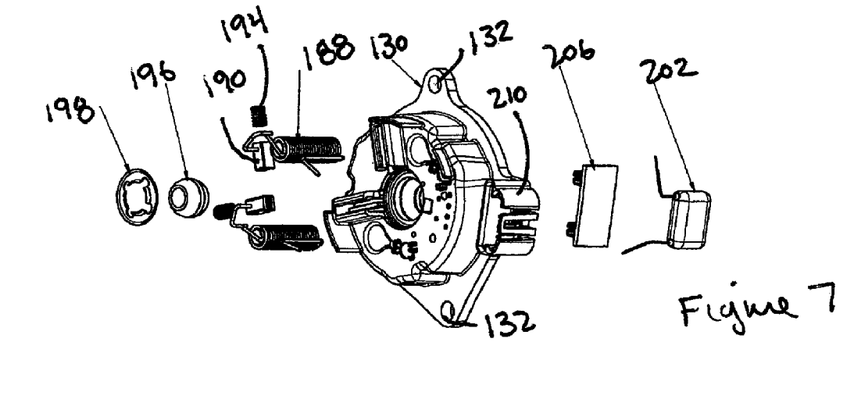
FIG. 7 is an exploded view of the end bell and various electrical components.
Figure 8:
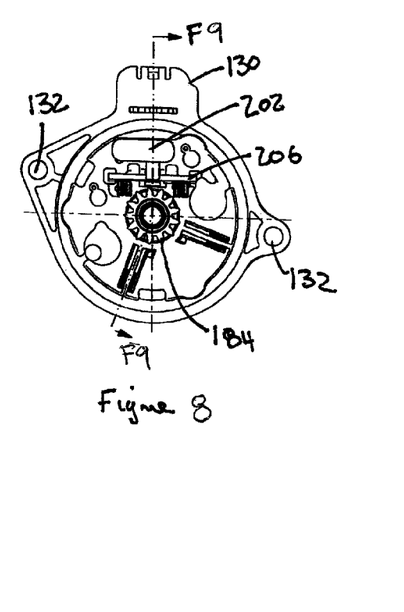
FIG. 8 is a bottom view of the end bell.
Figure 9:
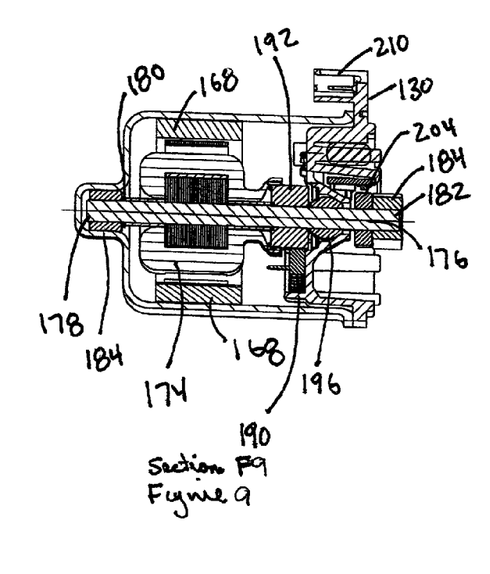
FIG. 9 is a cross sectional view taken across F9 on FIG. 8.

Referring now to FIGS. 7 through 9, the end bell 130 is used to position the electrical components and electrical connectors for the motor 145. The end bell 130 includes at least one aperture 132 which aligns with the at least one aperture 172 on the motor housing 110 such that fastening means can pass through the end bell 130 when securing the motor housing 110 to the ring gear housing 120.

The end bell 130 further includes two openings 186 for receipt of two inductors 188, which have the two brushes 190 secured thereto. Each brush 190 is positioned towards the commutator 192, defined by the armature 174, by compression springs 194. Positioned about the center of the end bell 130 is a spherical bearing 196 which permits the second end 182 of the armature shaft to pass therethrough. The spherical bearing 196 is held in place by a bearing retainer 198 and a bearing spacer 200 that abut the end of the commutator 192. The end bell 130 further holds a capacitor 202 that is used in combination with the inductors to reduce high frequency noise generated by the motor. A sense magnet 204 is also provided with a circuit board 206 having a hall effect device to provide a digital pulse train.

The end bell 130 includes a connector 210 for receiving an electrical plug (not shown) to make an electrical connection from the vehicle to the actuator 100. During operation the electric motor 145 rotates the pinion gear 184 and thereby converting electrical energy into the mechanical energy needed.

Figure 10:
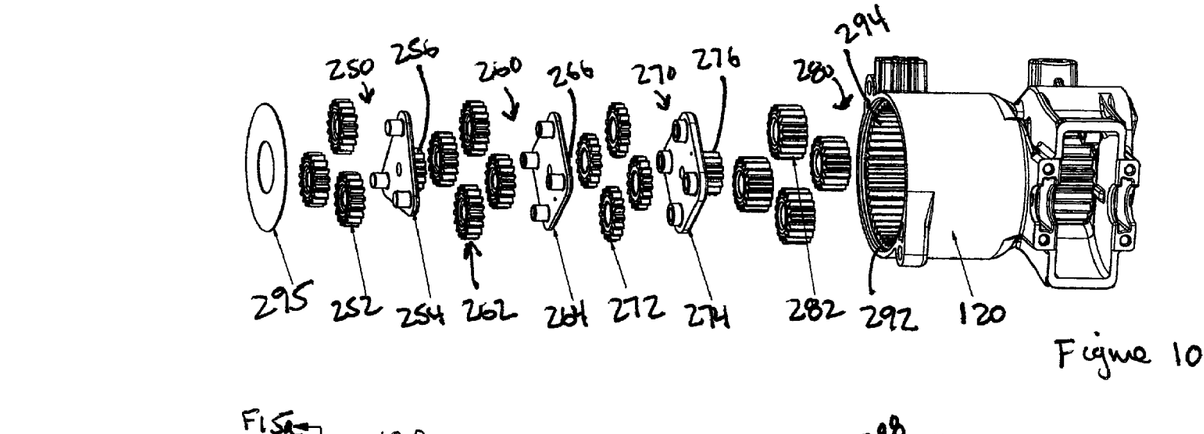
FIG. 10 is an exploded view of the ring gear housing and gear train.

The pinion gear 184 is meshed to a gear train 150 housed in the ring gear housing 120. Referring now to FIG. 10, the gear train 150 is designed as a four stage planetary gear train that reduces the speed of the motor while increases the torque through an output gear 300. The gear reduction from the pinion gear through the gear train 150 to the output gear 300 is around or up to 800 to 1, and preferably around or up to 750 to 1, and most preferably around or up to 700 to 1 which permits the actuator 100 to put out between 80 to 220 Nm torque.

Figure 11:
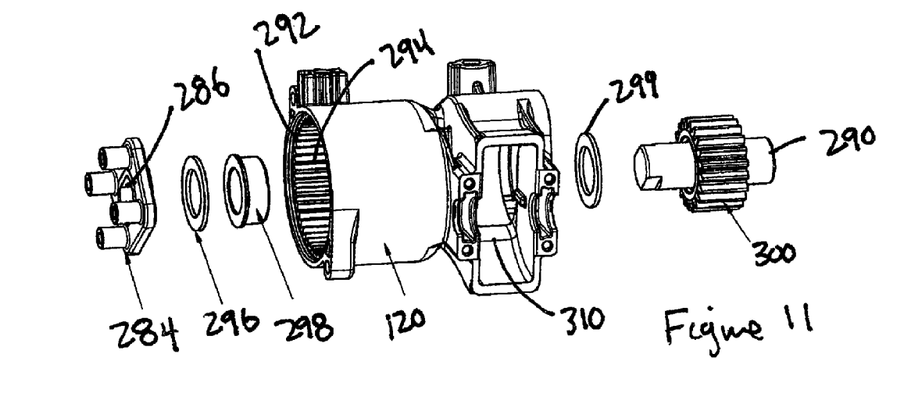
FIG. 11 is a partial exploded view of the ring gear housing and the output shaft with output gear.

The four stage planetary gear train is outlined by having a first stage 250 made of three first stage gears 252 mounted on a first stage triangular carrier plate 254. The rotation of the first stage triangular carrier plate 254 rotates a first stage sun gear 256. The first stage sun gear 256 when rotating rotates a second stage 260. The second stage 260 includes four second stage gears 262 that are meshed to the first stage sun gear 256 and that are mounted on a second stage carrier plate 264. The rotation of the second stage carrier plate 264 rotates a second stage sun gear 266, which in turn rotates the third stage 270. The third stage 270 includes four third stage gears 272 that are meshed to the second stage sun gear 266 and that are mounted on a third stage carrier plate 274. When the third stage carrier plate 274 rotates a third stage sun gear 276 rotates therewith. The third stage sun gear 276 causes the rotating of the fourth stage 280. The fourth stage 280 includes four fourth stage gears 282 that are meshed to the third stage sun gear 276 and that are mounted on a fourth stage carrier plate 284 (FIG. 11). The fourth stage carrier plate includes an opening 286 that receives an output shaft 290 such that the rotation of the fourth stage carrier plate 284 rotates the output shaft 290. Each stage includes gears similar to each other for that particular stage and may even include similar gears for each stage; however, depending upon the output desired this particular scope may change.

Figure 12:
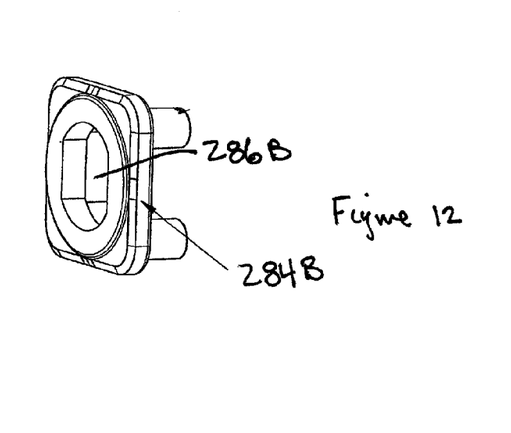
FIG. 12 is an embodiment of the fourth carrier plate.
Figure 13:
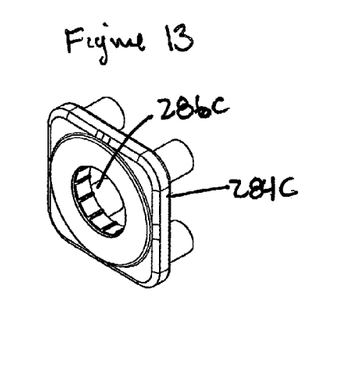
FIG. 13 is an alternative embodiment of the fourth carrier plate.

The gears are further meshed to an internal gear 292 formed on the interior 294 of the ring gear housing 120. A gear washer 295 may be positioned against the first set of gears 252, while a spacer 296 and a flange bearing 298 are used on the end of the output shaft proximate the opening 286 in the fourth stage carrier plate 284. The opening 286 and end of the output shaft 290 may have accompanying shapes such that the two coact with each other. For example, in one embodiment illustrated in FIG. 12, the opening 286B and end of the output shaft 290 may have an elliptical or slightly rectangular shape with rounded ends. However, in other embodiment illustrated in FIG. 13, the opening 286C on the fourth stage carrier plate 284c and corresponding output shaft (not shown) may simply be circular. Another spacer 299 may be positioned on the output shaft 290 and positioned on the other side of the flange bearing 298.

Figure 14:
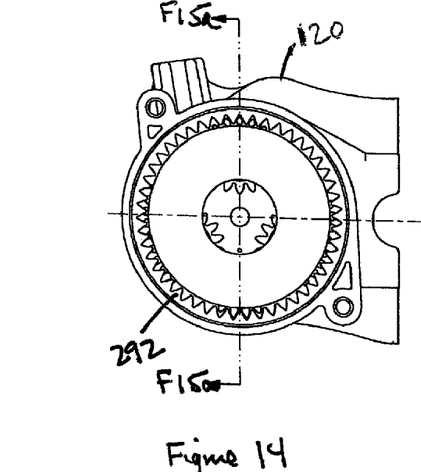
FIG. 14 is a bottom view of the ring gear housing.
Figure 15A:
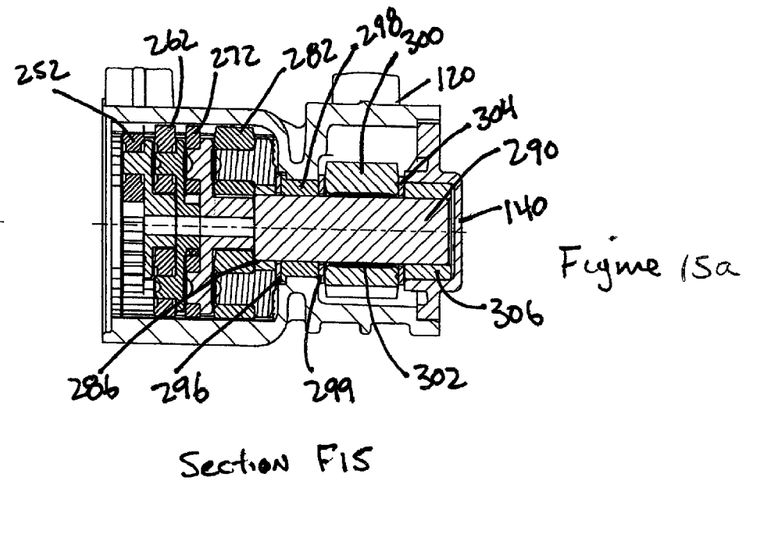
FIG. 15 is a cross sectional view taken across F15 on FIG. 14.
Figure 15B:
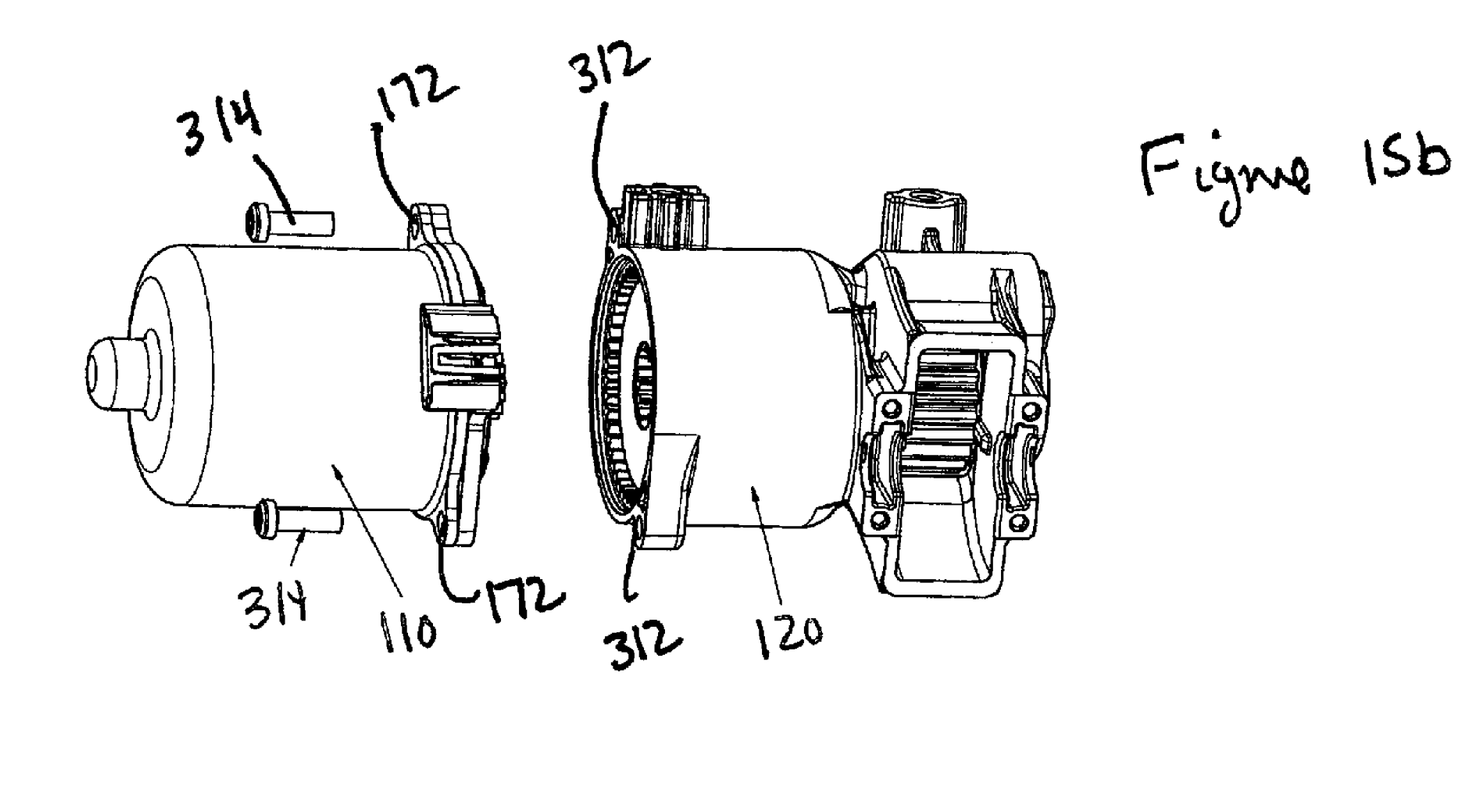

Referring now to FIGS. 11, 14 and 15a, the output gear 300 is mounted on the output shaft 290 such that when the output shaft 290 rotates from the rotation of the pinion gear 184, the output shaft 290 rotates in accordance with the reduction in speed and torque increase caused by the intermediate gear train 150. The output gear 300 further includes a tolerance or torque ring 302 and it sits in a lower section 310 of the ring gear housing 120.

A spacer 304 and a sleeve bearing 306 are positioned on the end 308 of the output shaft 290 which is also positioned in an end cap 140 that is secured to the ring gear housing 120. The motor hosing 110 is secured to the ring gear housing 120 (as mentioned above) when the openings 172 on the motor hosing 110 are aligned with openings 312 on the ring gear housing 120 and fastening means 314 (such as screws or bolts) are used (illustrated in FIG. 15b).

The present invention will thus provide an actuator 100 capable of a preferred peak sustainable output of about 200 Newton-meters of torque. Furthermore, the tolerance ring 302 in a slip torque application protects the gear train 150 and the seat assembly by limiting peak torque that occurs at excessively slow operating speeds while transmitting the operational torque required at speeds capable of operating the seat in an acceptable period of time. In one embodiment of the present invention, the tolerance ring 302 limits the operational torque to about 100-160 Newton-meters. The use of the tolerance ring in the current configuration also protects for potentially high forces resulting from manually inputted abusive handling of the seat in the vehicle.

Figure 16:
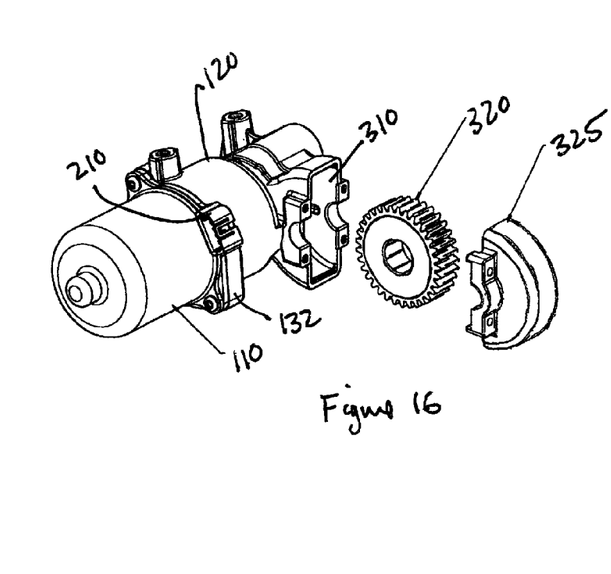
FIG. 16 is a partial exploded view of the ring gear housing with the seat gear and cap.
Figure 17:
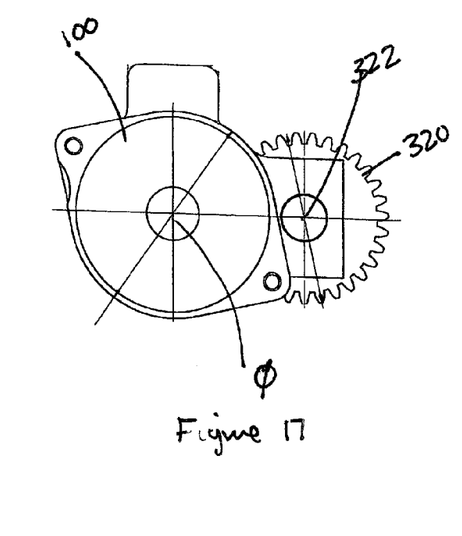
FIG. 17 is an end view of the actuator positioned on an axis that is parallel with the seat axle.

Referring now to FIG. 16, the output gear 300 is meshed with a seat gear 320 that is positioned on a seat axle 322 that is parallel or substantially parallel to the armature shaft 176, represented by $\phi$ in FIG. 17. This permits the actuator 100 to lie next to, parallel with, or against the frame of the seat, well hidden from the public's view, saving space and possible interference with a person using the seat. A gear cap 325 is secured against a side portion 310 of the ring gear housing 120. The seat gear 320 is thus used in combination with the actuator 100 to transfer the rotational motion of the actuator to a parallel axis of rotation. The seat gear 320 is thus used in combination with the side portion 310 of the ring gear housing 120 to allow easy mounting of the actuator 100 to a parallel axis $\phi$ while resisting the strong operating separation forces generated by the output and shaft gears.

Figure 18:
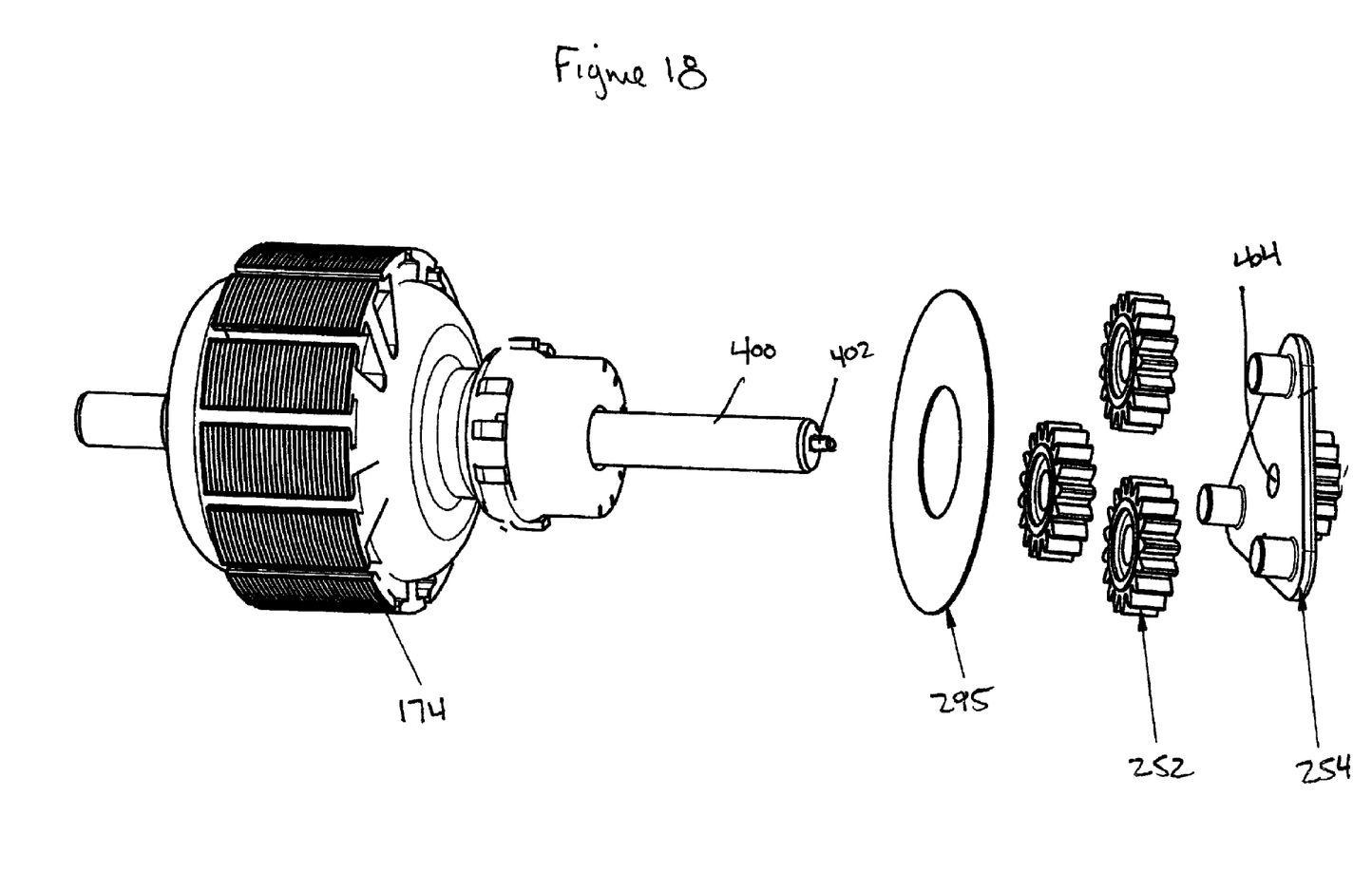
FIG. 18 is an alternative embodiment of the actuator having an armature shaft with a tip to position within an opening on the first carrier plate.

Various other embodiments are further provided herein. For example, as illustrated in FIG. 18, the armature shaft 400 may have a tip 402 that inserts into an opening 404 defined in the first carrier plate 254. The illustration in FIG. 18 has removed other components to simplify the view; however, it does not or should not reflect on the actual components needs to complete the electric motor or the connection to the gear motor housing. The tip 402 being placed into the opening 404 in the first carrier plate 254 was found to further help stabilize the first carrier plate and reduce noise. The tip may further extend into the second carrier plate if desired or even further into the other carrier plates. To further help reduce noise the planetary gears in the first and/or second planetary stages are made from a plastic material.

In another embodiment of the present invention, there is provided the above seat storage actuator made in accordance with the above description but provided with certain compositions and material characteristics that may aid the actuator 100 in achieving its desired output of about 200 Newton-meters of torque. This being noted, the following was determined to have a positive effect on the actuator:

(a) a seat pivot gear and the output gear are made with a powdered metal material with a chemical composition of:

| Metal | Percent of Material |
| --- | --- |
| FE | 94.9-97.7% |
| CR | 1-2% |
| NI | 0.5-2% |
| C | .3-.6% |
| MO | .5% MAX | a density of about 7.1 gm/cc and an apparent hardness of 39-49 HRC.

(b) fourth stage planetary gears are made with a powdered metal material per MPIF Std 35, having a material designation FN-0208-105HT, with a density of about 6.7-7.1 gm/cc; an apparent hardness of 27 HRC; and the fourth stage planetary gears have 17 teeth.

(c) third stage gears planetary are made with a powdered metal material per MPIF Std 35, having a material designation FN-0208-105HT, with a density of about 6.7-7.1 gm/cc; an apparent hardness of 27 HRC; and the third stage planetary gears have 17 teeth.

(d) the carrier plates and sun gears are made with a powdered metal with a material designation of FLN2-4405-120HT, having a density of 6.7-7.1 gm/cc; an apparent hardness of 27-37 HRC; an ultimate tensile strength of 120,000 PSI; and having the following chemical composition:

| Metal | Percent of Material |
| --- | --- |
| FE | 93.95-97.95% |
| C | .4-.7% |
| NI | 1-3% |
| MO | .65%-.95% |

The teeth of each sun gear are made in accordance with its corresponding carrier plates and have 13 teeth.

(e) the first and second stage planetary gears as mentioned above may be made from a plastic material; having the characteristics of including 17 teeth.

(f) the pinion gear is made with 13 teeth and made up of a powdered metal material with a chemical composition:

| Metal | Percent of Material |
| --- | --- |
| FE | 94.9-97.7% |
| CR | 1-2% |
| NI | 0.5-2% |
| C | .3-.6% |
| MO | .5% MAX |

(g) the internal gear on the ring gear housing is preferably made of a plastic material and includes 47 teeth;

(h) the fourth stage carrier plate is made from a powdered metal per MPIF standard 35. 2003 material designation FLN2-4405-120HT with a density of 6.7-7.1 gm/cc and an apparent hardness of 27-37 HRC; and (i) the torque ring may be made from a carbon steel or equivalent.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. An electric vehicle seat stowing structure for moving a seat between a seating position and a storage position including a seat storage frame having an axle positioned along a rear portion of the seat and having a seat gear mounted to said axle, the improvement comprising:

an actuator for moving the seat between the seating position and the storage position, the actuator having an output gear positioned about an output shaft that is defined along the longitudinal axis of the actuator, the actuator mounted within a portion of the seat storage frame, such that the output gear and the seat gear are meshed thereto, the actuator being further mounted within said portion such that the axis of the actuator is substantially parallel to the axle of said seat storage frame, whereby when said seat is moved between the seating position and the storage position, the actuator is moved therewith.

2. The vehicle seat storage structure of claim 1, wherein the actuator includes a four stage planetary gear train.

3. The vehicle seat storage structure of claim 2 wherein the actuator includes a gear reduction ratio of around one or more of the following reduction ratios, 800 to 1, or 700 to 1.

4. The vehicle seat storage structure of claim 2, wherein planetary gears defined by the first stage of the four stage planetary gear train is made from a plastic material to reduce noise.

5. The vehicle seat storage structure of claim 4, wherein planetary gears defined by the second stage of the four stage planetary gear train is made from a plastic material to reduce noise.

6. The vehicle seat storage structure of claim 1, wherein the actuator includes a four pole, two brush DC motor.

7. The vehicle seat storage structure of claim 6, wherein the DC motor has a wave wind armature coil pattern.

8. The vehicle seat storage structure of claim 1, wherein the actuator provides a peak sustainable output of 200 Newton-meters of torque.

9. The vehicle seat storage structure of claim 8 further comprising a tolerance ring positioned between the output gear and output shaft to provide an operational output of 100-160 Newton-meters of torque.

10. An electric vehicle seat stowing structure for moving a seat between a seating position and a storage position including a seat storage frame having an axle positioned along a rear portion of the seat and having a seat gear mounted to said axle, the improvement comprising:

an actuator for moving the seat between the seating position and the storage position, the actuator having an output gear positioned about an output shaft that is defined along the longitudinal axis of the actuator, the actuator mounted within a portion of the seat storage frame, such that the output gear and the seat gear are meshed thereto, the actuator being further mounted within said portion such that the axis of the actuator is substantially parallel to the axle of said seat storage frame, the actuator having a four stage planetary gear train and wherein the first stage of the four stage planetary gear train includes three first stage planetary gears rotatably mounted to a triangularly shaped planetary carrier plate, and whereby when said seat is moved between the seating position and the storage position, the actuator is moved therewith.

11. The vehicle seat storage structure of claim 10, wherein the second, third, and fourth stages of the four stage planetary gear train separately include four planetary gears rotatably mounted to a square shaped planetary carrier plate.

12. The vehicle seat storage structure of claim 2, wherein the seat gear is positioned within a gear cap that is secured against a lower portion of a ring gear housing defined by the actuator.

13. An electric vehicle seat storage structure for moving a seat between a seating position and a storage position including a seat storage frame having a longitudinal axle positioned along a portion of the seat, the improvement comprising:
an actuator for driving said axle to move the seat between a seating position and the storage position, the actuator is mounted within a portion of the seat storage frame such that the actuator is positioned longitudinally and parallel to the axle of the seat storage frame, such that when said seat is moved between the seating position and the storage position, the actuator is moved therewith.

14. The vehicle seat storage structure of claim 13, wherein the portion of the seat storage frame for mounting said actuator is positioned such that the actuator is oriented such that a longitudinal axis of the actuator is substantially parallel to the axle of said seat storage frame.

15. The vehicle seat storage structure of claim 14, wherein the actuator has an output gear positioned about an output shaft that is defined along the longitudinal axis of the actuator and the output gear is meshed to a seat gear mounted to the seat axle.

16. The vehicle seat storage structure of claim 13, wherein the actuator includes a four stage planetary gear train.

17. The vehicle seat storage structure of claim 16, wherein the actuator includes a gear reduction ratio of around 700 to 1.

18. The vehicle seat storage structure of claim 16, wherein planetary gears defined by the first stage of the four stage planetary gear train is made from a plastic material to reduce noise.

19. The vehicle seat storage structure of claim 16, wherein planetary gears defined by the second stage of the four stage planetary gear train is made from a plastic material to reduce noise.

20. The vehicle seat storage structure of claim 13, wherein the actuator includes a four pole, two brush DC motor with a wave wind armature coil pattern.

21. The vehicle seat storage structure of claim 15, wherein the actuator provides a peak sustainable output of 200 Newton-meters of torque.

22. The vehicle seat storage structure of claim 21 further comprising a tolerance ring positioned between the output gear and output shaft to provide an operational output of about 100-160 Newton-meters of torque.

23. The vehicle seat storage structure of claim 15, wherein the seat gear is positioned within a gear cap that is secured against a lower portion of a ring gear housing defined by the actuator.

24. The vehicle seat storage structure of claim 15, wherein the actuator includes an electrical motor that rotates a pinion gear mounted on an armature shaft and includes a multi-stage planetary gear train, having at least a first stage meshed to said pinion gear and a last stage defined to rotate the output gear.

25. An electric vehicle seat storage structure for moving a seat between a seating position and a storage position including a seat storage frame having a longitudinal axle positioned along a portion of the seat, the improvement comprising:
an actuator for driving said axle to move the seat between a seating position and the storage position, the actuator is mounted within a portion of the seat storage frame such that the actuator is positioned longitudinally and parallel to the axle of the seat storage frame, such that when said seat is moved between the seating position and the storage position, the actuator is moved therewith, and wherein the portion of the seat storage frame for mounting said actuator is positioned such that the actuator is oriented such that a longitudinal axis of the actuator is substantially parallel to the axle of said seat storage frame, and wherein the actuator has an output gear positioned about an output shaft that is defined along the longitudinal axis of the actuator and the output gear is meshed to a seat gear mounted to the seat axle, and wherein the actuator includes an electrical motor that rotates a pinion gear mounted on an armature shaft and includes a multi-stage planetary gear train, having at least a first stage meshed to said pinion gear and a last stage defined to rotate the output gear, and the armature shaft includes a tip that extends into a centered opening on a first stage carrier plate defined by the first stage of the multi-stage planetary gear train.

26. An actuator comprising:
a motor housing
a four pole, two brush DC motor mounted within the motor housing to rotate a pinion gear mounted on an armature shaft;
a gear housing within an internal gear secured to the motor housing
a four stage planetary gear train, having a first stage meshed to the pinion gear, the four stage planetary gear train being further meshed to the internal gear, the four stage planetary gear train being defined to provide a gear reduction of around 700 to 1; and
an output gear mounted on an output shaft that is rotated by a last stage, defined by the four stage planetary gear train.

27. The actuator of claim 26, wherein planetary gears defined by the first stage of the four stage planetary gear train is made from a plastic material to reduce noise.

28. The actuator of claim 26, wherein planetary gears defined by the second stage of the four stage planetary gear train is made from a plastic material to reduce noise.

29. The actuator of claim 26, wherein the armature shaft includes a tip, the tip further extends into a centered opening on a first stage carrier plate defined by the first stage of the four stage planetary gear train.

30. The actuator of claim 26, wherein the DC motor has a wave wind armature coil pattern.

31. The actuator of claim 26 further comprising a peak sustainable output of 200 Newton-meters of torque.

32. The actuator of claim 26 further comprising a tolerance ring positioned between the output gear and output shaft to provide an operational output of 100-160 Newton-meters of torque.

33. An actuator comprising:
a motor housing;
a four pole, two brush DC motor mounted within the motor housing to rotate a pinion gear mounted on an armature shaft;
a gear housing within an internal gear secured to the motor housing;
a four stage planetary gear train, having a first stage meshed to the pinion gear, the four stage planetary gear train being further meshed to the internal gear, the four stage planetary gear train being defined to provide a gear reduction of around 700 to 1: and an output gear mounted on an output shaft that is rotated by a last stage, defined by the four stage planetary gear train and wherein the first stage of the four stage planetary gear train includes three first stage planetary gears rotatably mounted to a triangularly shaped planetary carrier plate.

34. The actuator of claim 26, wherein the second, third, and fourth stages of the four stage planetary gear train separately include four planetary gears rotatably mounted to a square shaped planetary carrier plate.

* * * * *